United States Patent [19]

Jackson, Jr. et al.

[11] 4,153,779

[45] May 8, 1979

[54] LIQUID CRYSTAL COPOLYESTER CONTAINING A SUBSTITUTED PHENYLHYDROQUINONE

[75] Inventors: Winston J. Jackson, Jr., Kingsport; Gary G. Gebeau, Johnson City; Herbert F. Kuhfuss, Kingsport, all of Tenn.

[73] Assignee: Eastman Kodak Company, Rochester, N.Y.

[21] Appl. No.: 918,861

[22] Filed: Jun. 26, 1978

[51] Int. Cl.$^2$ .................. C08G 63/18; C08G 63/00
[52] U.S. Cl. .................. 528/176; 528/190; 528/191; 528/193; 528/194; 528/272; 528/298; 528/299
[58] Field of Search ............. 528/176, 190, 191, 193, 528/194, 272, 298, 299

[56] References Cited

U.S. PATENT DOCUMENTS

| | | | |
|---|---|---|---|
| 3,160,602 | 12/1964 | Kantor et al. | 528/190 X |
| 3,991,013 | 11/1976 | Pletcher | 528/176 X |
| 3,991,014 | 11/1976 | Kleinschuster | 528/191 |
| 4,064,108 | 12/1977 | Inata et al. | 528/190 X |
| 4,066,620 | 1/1968 | Kleinschuster et al. | 528/193 X |
| 4,075,262 | 2/1978 | Schafgen | 528/176 X |

FOREIGN PATENT DOCUMENTS

2520820 11/1975 Fed. Rep. of Germany .......... 528/176

*Primary Examiner*—Lucille M. Phynes
*Attorney, Agent, or Firm*—Charles R. Martin; III Reece

[57] ABSTRACT

Disclosed is a liquid crystal copolyester having unobviously high mechanical properties. The copolyester is prepared from an aromatic dicarboxylic acid, a substituted phenylhydroquinone and optionally other hydroquinones.

3 Claims, No Drawings

LIQUID CRYSTAL COPOLYESTER CONTAINING A SUBSTITUTED PHENYLHYDROQUINONE

This invention relates to a liquid crystal polyester which exhibits unobviously high mechanical properties.

In the last four decades, a wide variety of plastics has been developed to fulfill a wide variety of uses. Starting with the commercial introduction of nylon 66 in 1938 and continuing with the introduction of polyacetal, polycarbonate, polyphenylene oxide, polysulfone and polytetramethylene terephthalate, new plastics have been continually introduced to overcome deficiencies in previous plastics. As plastics were developed to satisfy ever more demanding requirements, the aromatic character of the polymer often increased. As the amount of aromatic character increased, the melting point of the polymer increased. Ultimately, the increased melting point of highly aromatic polymers became so high that melt processing the polymer challenged the heating capacity of even the most sophisticated melt spinning and molding equipment and even approached the thermal stability limit of the polymers themselves. Thus, as the demand for polymers with greater and greater mechanical properties was met, the melting point of the polymers generally went up.

In very recent years the never-ending search for polymers with greater and greater mechanical properties has resulted in a fundamental breakthrough in polymer science by development of a new class of polymers exhibiting a general overall balance of mechanical properties substantially enhanced over previous polymers. These polymers have been described by various terms, including "liquid crystalline", "liquid crystal", and "anisotropic". Briefly, the polymers of this new class are thought to involve a parallel ordering of the molecular chains. The state wherein the molecules are so ordered is often referred to as the liquid crystal state or the nematic phase of the liquid crystal state. These polymers are prepared from monomers which are generally long, flat, and fairly rigid along the long axis of the molecule and have chain extending linkages that are either coaxial or parallel. Some liquid crystal polymers, often called lyotropic liquid crystals, can be brought into the liquid crystal state by dissolving the polymers in a solution, such as the solution spinning of poly(p-phenylene terephthalamide) from a sulfuric solution as disclosed in U.S. Pat. No. 3,671,542. Other liquid crystal polymers, often called thermotropic liquid crystals, can be more advantageously brought into the liquid crystal state by merely changing the temperature of the polymer.

Although the exact structure of liquid crystal polymers has not yet been fully understood, liquid crystal polymers are known to have exceptionally high mechanical properties compared to analogous polymers not having a liquid crystal character. For example, in U.S. Pat. No. 3,804,805, it is reported that a liquid crystal polyester prepared by the acidolysis of polyethylene terephthalate with 60 mole percent p-acetoxybenzoic acid has a flexural modulus of almost $18 \times 10^5$ psi., compared to a flexural modulus of only about $3 \times 10^5$ psi. for an analogous polyester prepared by an ester interchange procedure using dimethyl terephthalate, ethylene glycol, and 60 mole percent methyl p-hydroxybenzoate.

As is the case of previous polymers, it was recognized that increasing the aromatic character of a liquid crystal polyester would enhance the general overall balance of mechanical properties. Also, just as with previous polymers, when the aromatic character of the liquid crystal polyesters became greater, the melting points became greater. In the case of previous polymers, the increasing melting point merely challenged the heating capacity of conventional equipment to heat the polymer in order to melt-process the polymer into useful articles. In the case of liquid crystal polyesters, increasing the aromatic character of the polyester by preparing a wholly aromatic polyester did greatly enhance the mechanical properties but created melting points that far exceeded the capability of conventional equipment to melt the polymer. For example, U.S. Pat. No. 3,637,595 discloses that aromatic polyesters prepared from terephthalic acid, hydroquinone and varying amounts of p-hydroxybenzoic acid melt in the general range of 800° to 900° F. Obviously, the melting point of these polymers is far too high and the thermal stability is insufficient to permit these polymers to be used in conventional melt-processing equipment.

Several solutions have been developed to solve the problem of aromatic liquid crystal polyesters having a melting point so high the polyester could not be melt processed in conventional equipment so as to take advantage of the outstanding mechanical properties of the aromatic polyester. One solution was to incorporate a substitutent on some of the aromatic rings of the polyester, preferably on the diol ring. For example, it is well known that use of chloro, methyl or ethyl hydroquinone lowers the melting point of the polyester. Although this approach can be used to lower the melting point, typically the mechanical properties are also substantially reduced.

We have now discovered an aromatic liquid crystal polyester which has solved the high melting point problem in aromatic liquid crystal polyesters because this polyester has typical liquid crystal polyester properties as well as a melting point that is low enough to permit the polyester to be melt processed into useful articles, such as fibers and molded articles, using conventional equipment. We have accomplished this remarkable objective of lowering the melting point of an aromatic liquid crystal polyester and still retaining typical liquid crystal properties by using a substituted phenylhydroquinone as the principal diol.

Our invention, therefore, can be broadly thought of as a polyester prepared from a dicarboxylic acid, which can be terephthalic acid or 2,6-naphthalenedicarboxylic acid or mixtures thereof, a substituted phenylhydroquinone and, optionally, other hydroquinones. This polyester can be specifically defined as a polyester having a fiber-forming molecular weight consisting essentially of the following radicals:

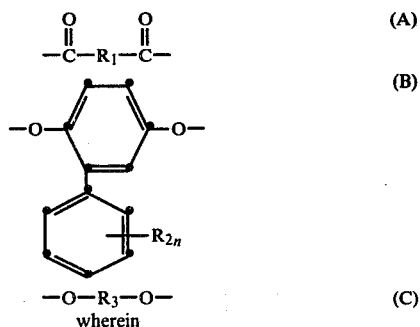

wherein

-continued

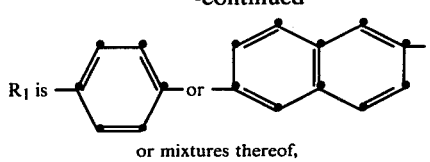

or mixtures thereof,

R₂ is Cl—, Br— or a monovalent alkyl radical having one to four carbon atoms, n is 1, 2 or 3,

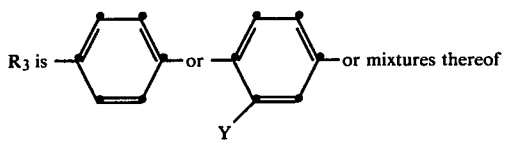

where Y is Cl—, Br— or a monovalent alkyl radical having one to three carbon atoms, the range of radical (C) is 0 to 40 mole percent, based on the total moles of radical (B) and radical (C) combined.

Preferably the dicarboxylic acid is terephthalic acid and more preferably the polyester consists essentially of terephthalic acid and p-tolylhydroquinone.

As will also be recognized by those skilled in the art, radical (A) is the radical remaining after removal of the hydroxyl groups from the dicarboxylic acid, radical (B) is the radical remaining after removal of the terminal hydrogen atoms from the substituted phenylhydroquinone, and optional radical (C) is the radical remaining after removal of the terminal hydrogen atoms from other hydroquinones.

The polyesters of this invention have been described as "consisting essentially of" radicals (A) and (B) and optionally radical (C). By the term "consisting essentially of", and words of similar import, we mean that the polyester can contain other divalent radicals in minor amounts as long as the mechanical properties and melting point of the polyester remain unobvious in view of the prior art. For example, minor amounts of other isomers of naphthalenedicarboxylic acid can be used. By the term "consisting essentially of" we also mean that the polyester of this invention may contain nucleating agents, fillers, pigments, glass fibers, asbestos fibers, antioxidants, stabilizers, plasticizers, lubricants, fire-retardants, and other additives.

Applicants are aware of a large volume of prior art relating to the polyesters of this invention.

German Offenlegungsschrift No. 2,520,820 discloses liquid crystal terephthalic acid/2,6-naphthalenedicarboxylic acid containing polyesters prepared using methyl or ethyl hydroquinone (Examples 4G and 4H).

U.S. Pat. No. 3,160,602 to Kantor discloses terephthalic acid containing polyesters containing substituted hydroquinone. Methyl, ethyl, and phenylhydroquinone are within the general formula disclosed in Column 4. Also, phenylhydroquinone is disclosed in Column 6 and Example 18.

U.S. Pat. No. 3,778,410 discloses a process for preparing a polyester by reacting a polyester prepared from terephthalic acid and hydroquinone.

Belgian Patent No. 828,935 contains a disclosure similar to German Offenlegunsschrift No. 2,520,820.

U.S. Pat. No. 3,991,013 discloses polyesters prepared from 2,6-naphthalenedicarboxylic acid, a substituted hydroquinone and ethylenedioxy-4,4'-dibenzoic acid.

U.S. Pat. No. 3,991,014 discloses polyesters prepared from 2,6-naphthylenedicarboxylic acid, a substituted hydroquinone and bis(4-carboxyphenyl)ether.

Applicants regard the closest prior art to be the German Offenlegungsschrift combined with U.S. Pat. No. 3,160,602 to Kantor. Since the German Offenlegungsschrift discloses terephthalic acid/2,6-naphthalenedicarboxylic acid containing liquid crystal polyesters prepared using methyl and ethyl hydroquinone and since Kantor discloses terephthalic acid/2,6-naphthalenedicarboxylic acid containing polyesters prepared using methyl, ethyl or phenylhydroquinone, it would be prima facie obvious to prepare a polyester of terephthalic acid, 2,6-naphthalenedicarboxylic acid and a substituted phenylhydroquinone by substituting the phenylhydroquinone of Kantor for the methyl or ethyl hydroquinone of the German Offenlegungsschrift since Kantor shows either methyl, ethyl or phenylhydroquinone can be used to prepare terephthalic acid/2,6-naphthalenedicarboxylic acid containing polyesters.

The substituted phenylhydroquinone containing polyesters of this invention are thought to be unobvious over this combination of references because this polyester has a melting point low enough to melt process the polyester in conventional equipment but yet exhibits properties which are typical of liquid crystal polyesters and are unobviously higher than would be expected. The mechanical properties are higher than would be expected because the disclosure of the German Offenlegungsschrift teaches that one would expect the mechanical properties to diminish substantially as the molecular weight of the substituent on the hydroquinone increased. The below table summarizes the disclosure of the German Offenlegungsschrift concerning the manner in which a typical mechanical property, tenacity of a fiber, diminishes as the molecular weight of the substituent on the hydroquinone ring increases.

| Ex. | Hydroquinone Substituent | Molecular Weight of Substituent | Flow Point, °C. | Tenacity, Grams/Denier |
|---|---|---|---|---|
| 4G | —CH₃ | 15 | 301 | 20 |
| 4H | —CH₂CH₃ | 29 | 292 | 12 |

Thus, the prior art teaches that as the size of the substituent on the hydroquinone ring increases, the mechanical properties diminish. Quite surprisingly, we have now found that when one uses as a substitutent a substituted phenyl group having a molecular weight of more than 77, the properties are higher than would be expected and are typical of liquid crystal polyesters.

The polyesters of the invention can be prepared by an acidolysis procedure well known in the art wherein terephthalic acid or 2,6-naphthalenedicarboxylic acid or combinations of terephthalic acid and 2,6-naphthalenedicarboxylic acid and a diester of a substituted phenylhydroquinone and optionally a diester of the other hydroquinones are contacted under an increased temperature ranging up to about 340°–380° C., depending upon the stability of the substituent, and a decreasing pressure to form a high molecular weight polymer. As a specific example, a mixture of 11.6 g (0.07 mole) terephthalic acid and 19.9 g (0.07 mole) of the diacetate ester of p-tolylhydroquinone is placed in a 100-ml. flask equipped with a stirrer, a short distillation column, and an inlet for nitrogen. The flask is evacuated and purged three times with nitrogen before being lowered into a metal bath maintained at 110° C. The mixture is heated under a nitrogen atmosphere with stirring to a temperature of 300° C. at which point acetic acid begins to distill rapidly from the flask. After the reaction mixture is heated with stirring at this temperature for about one hour, the temperature of the bath is increased to 350° C. for 30 minutes. A vacuum of 0.5 mm of mercury is then applied over a period of 10 minutes. After stirring is continued under 0.5 mm of mercury at 360° C. for about 15 minutes, a medium melt viscosity, opaque, fibrous, amber polymer is obtained. The polymer has a molecular weight of at least 10,000 and an inherent viscosity of 2.4. The polymer can be melt spun into a textile fiber.

Other polyesters within the scope of the invention containing 2,6-naphthalenedicarboxylic acid instead of all or part of the terephthalic acid and optionally containing other hydroquinones can be prepared by a similar procedure but using slightly different reaction temperatures because of differences in melting points and thermal stability of the substituents, e.g., bromine and chlorine substituents are less stable than alkyl.

The substituted phenylhydroquinones useful in this invention correspond to the structure

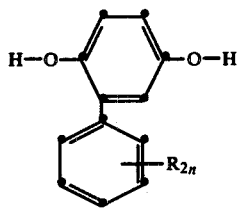

wherein $R_2$ can be Cl—, Br— or a monovalent alkyl radical having one to four carbon atoms and n is 1, 2 or 3. Examples are p-tolylhydroquinone, p-chlorophenylhydroquinone, p-tert-butylphenylhydroquinone, 2,4,6-trimethylphenylhydroquinone and m-ethylphenylhydroquinone. Preferably $R_2$ is —$CH_3$, n is 1 and the R is located in the para position to form p-tolylhydroquinone. These substituted phenylhydroquinones and methods for their preparation are well known in the art.

The other hydroquinones which can contribute optional radical (C) can be either diesters of hydroquinone or a single substituted hydroquinone, such as chlorohydroquinone, bromohydroquinone or an alkyl substituted hydroquinone, such as methyl, ethyl or propyl hydroquinone. A wide variety of diesters such as the diacetate, dipropionate, dibutyrate and dibenzoate can be used. Preferably the diacetate or dipropionate are used. These compounds and methods for their preparation are well known in the art.

The polyesters of this invention have been described as having "unobviously high mechanical properties". By this term we mean the mechanical properties of the polyesters of this invention are unobviously higher than one would expect for the specific polyester of phenylhydroquinone.

The inherent viscosity of the polyesters of this invention can be routinely determined, and are at least 0.5, and preferably at least 1.0, measured at 25° C. using 0.1 gram of polymer per 100 ml. of a solvent composed by weight of 25 percent phenol, 35 percent tetrachloroethane, and 40 percent p-chlorophenol. The molecular weights of the polyester of the invention are high enough to be in the fiber-forming range. The minimum fiber-forming molecular weight of the polymer is thought to be around 5,000. In most cases the polyester of the invention has a molecular weight above 8,000 and can have a molecular weight as high as around 20,000 and in some instances the molecular weight can range up to 25,000 or even higher.

We claim:

1. A copolyester having a fiber-forming molecular weight consisting essentially of the following divalent radicals

 (A)

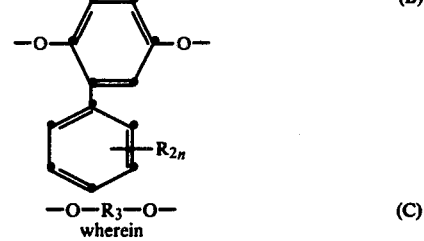 (B)

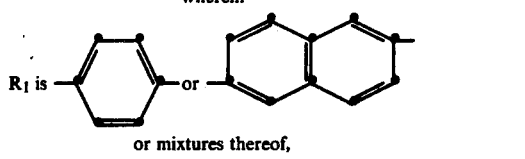 (C)
wherein $R_1$ is 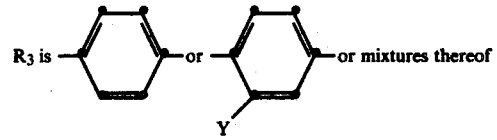

or mixtures thereof, $R_2$ is Cl—, Br— or a monovalent alkyl radical having one to four carbon atoms, n is 1, 2 or 3, $R_3$ is 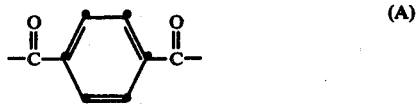 or mixtures thereof where Y is Cl—, Br— or a monovalent alkyl radical having one to three carbon atoms, the range of radical (C) is 0 to 40 mole percent, based on the total moles of radical (B) and radical (C) combined.

2. The copolyester of claim 1 wherein radical (C) is

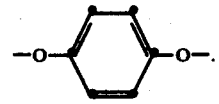

3. A polyester having a fiber-forming molecular weight consisting essentially of the following divalent radicals

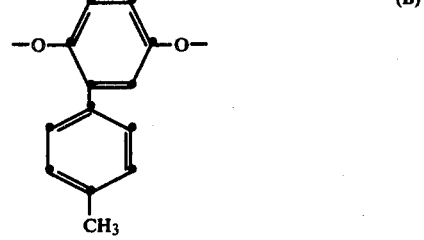

* * * * *